(12) United States Patent
Henry

(10) Patent No.: US 10,687,000 B1
(45) Date of Patent: Jun. 16, 2020

(54) CROSS-EYED SENSOR MOSAIC

(71) Applicant: Rockwell Collins, Inc., Cedar Rapids, IA (US)

(72) Inventor: Daniel Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/009,787

(22) Filed: Jun. 15, 2018

(51) Int. Cl.
| H04N 5/265 | (2006.01) |
| G01J 5/10 | (2006.01) |
| H04N 5/232 | (2006.01) |
| G01J 5/06 | (2006.01) |
| H04N 5/33 | (2006.01) |
| H04N 5/247 | (2006.01) |
| G01J 5/00 | (2006.01) |

(52) U.S. Cl.
CPC .............. *H04N 5/265* (2013.01); *G01J 5/061* (2013.01); *G01J 5/10* (2013.01); *H04N 5/23232* (2013.01); *H04N 5/247* (2013.01); *H04N 5/33* (2013.01); *G01J 2005/0077* (2013.01); *G01J 2005/106* (2013.01)

(58) Field of Classification Search
None
See application file for complete search history.

(56) References Cited

U.S. PATENT DOCUMENTS

| 9,924,078 B2* | 3/2018 | Wieser | G08B 13/248 |
| 10,145,743 B2* | 12/2018 | Timofeev | G01J 5/024 |
| 2012/0075427 A1* | 3/2012 | Yahav | G06F 3/017 348/47 |
| 2015/0185592 A1* | 7/2015 | Eineren | G03B 17/02 348/375 |
| 2017/0211984 A1* | 7/2017 | Simolon | G01J 1/44 |
| 2018/0061008 A1* | 3/2018 | Kormos | H04N 5/33 |

* cited by examiner

*Primary Examiner* — Christopher Braniff
(74) *Attorney, Agent, or Firm* — Donna P. Suchy

(57) ABSTRACT

An infrared sensor including a plurality of infrared cameras is described. Each infrared camera includes an infrared detector and imaging optics. The imaging optics are arranged to image infrared light onto the infrared detector, the imaging optics having a field of view with a center optical axis, and field of view boundary lines bounding the field of view on sides of the field of view. The infrared cameras are arranged such that the center optical axes of the field of views intersect each other, and the fields of view overlap each other.

20 Claims, 4 Drawing Sheets

CROSS-EYED SENSOR MOSAIC

The inventive concepts disclosed herein generally relate to the field of imaging sensors.

BACKGROUND

Imaging sensors may be used for imaging objects in applications such as airborne imaging. The size and resolution of imaging sensors often depends on the wavelength range of radiation which may be detected by detectors of the imaging sensors. For example, imaging sensors for visible light are known to provide higher resolution, e.g. ultra HD 4K, in a single low size, weight, power, and cost (SWAP-C) package. Radiation wavelength detection bands other than visible often cannot match visible wavelengths for high resolution and low SWAP-C.

Uncooled long wave infrared (LWIR) sensors (sensitive to infrared radiation in the wavelength range of 8-14 µm), for example, have not gotten beyond XGA resolution (1024×768). Moreover, VGA resolution (640×480) for uncooled LWIR sensors is significantly less expensive on a per pixel cost basis.

Infrared sensors may be arranged in a configuration where the sensors have a plurality of cameras arranged in a mosaic, and each camera provides an image. Such sensors are arranged such that the field of views (FOVs) of the cameras may overlap, but the center optical axes of the cameras do not intersect. Each of the cameras has its separate window from which it receives IR light to be imaged onto a detector of the camera. Such an arrangement is known as a butted field of view mosaic.

SUMMARY

In one aspect, embodiments of the inventive concepts disclosed herein are directed to an infrared sensor. The infrared sensor includes a plurality of infrared cameras. Each infrared camera includes an infrared detector and imaging optics. The imaging optics are arranged to image infrared energy onto the infrared detector, the imaging optics having a field of view with a center optical axis, and field of view boundary lines bounding the field of view on sides of the field of view. The infrared cameras are arranged such that the center optical axes of the field of views intersect each other, and the fields of view overlap each other.

In a further aspect, embodiments of the inventive concepts disclosed herein are directed to an optical sensor. The optical sensor includes a plurality of cameras. Each camera includes a detector and imaging optics. The imaging optics are arranged to image light onto the detector, the imaging optics having a field of view with a center optical axis, and field of view boundary lines bounding the field of view on sides of the field of view. The cameras are arranged such that the center optical axes of the fields of view intersect each other, and the field of views overlap each other.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding a cross-eyed field of view arrangement provide for a lower SWAP-C by allowing for a single optical window through which pass the fields of view of the different cameras arranged in a mosaic. This arrangement is in contrast to a butted field of view mosaic arrangement, which typically have a separate optical window for each camera, or would require a very large window for all of the cameras.

Moreover, according to embodiments of the inventive concepts disclosed herein regarding a cross-eyed field of view arrangement for the cameras, and a controller that generates a composite image based on the images of each of the cameras, a composite image can be generated having an increased resolution as compared to the individual images from the cameras. Thus, for example, if the resolution of the image of the individual cameras is VGA, the composite image generated may have a resolution greater than that of VGA. The arrangement allows for an increase in pixels in a desired FOV compared to that for a single camera. The inventive concepts disclosed herein are not limited to the individual cameras having a VGA resolution, and any other resolutions, such as XGA for example, are possible.

Figure 1:
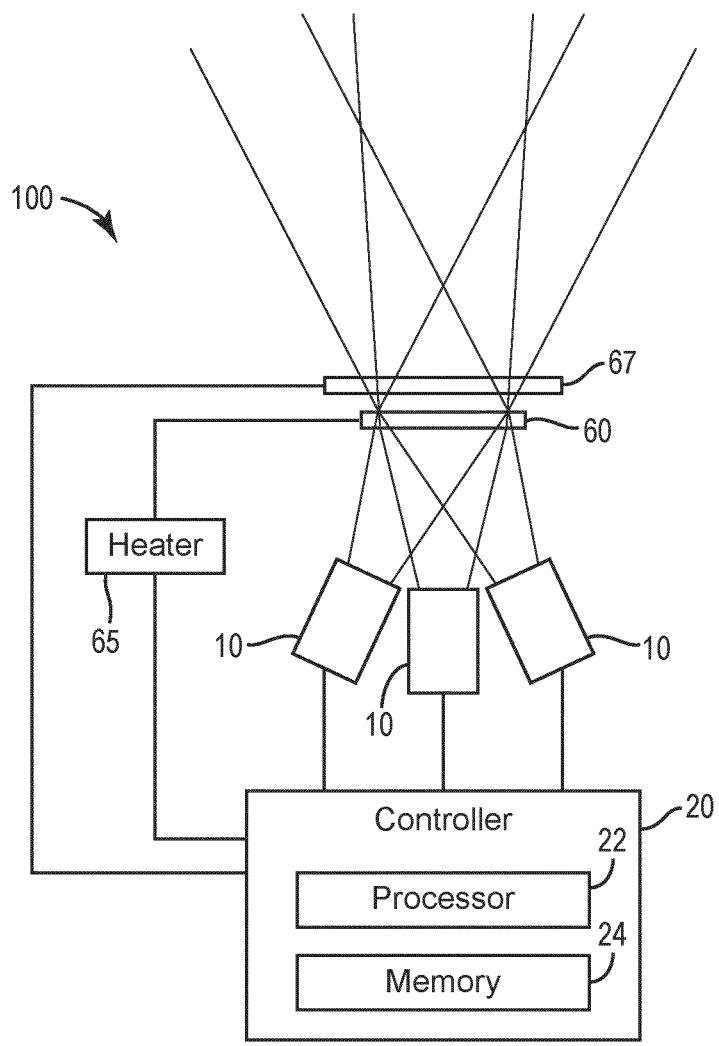
FIG. 1 is a schematic illustrating an infrared sensor according to inventive concepts disclosed herein.

FIG. 1 is schematic of an infrared sensor 100 according to inventive concepts disclosed herein. The infrared sensor 100 includes a plurality of infrared cameras 10, and a controller 20.

The controller 20 may include a processor 22 or a computer configured to, such as by being programmed, or hardwired, or by firmware, to perform certain functions. The controller may include a memory 24, or other non-transitory computer readable medium, which stores programs executed by the processor 22 of the controller 20.

Figure 2:
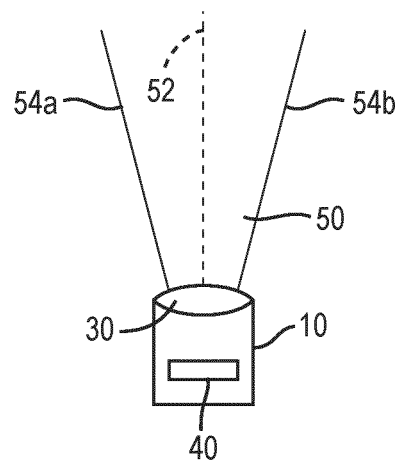
FIG. 2 is a schematic illustrating an infrared camera of the infrared sensor of FIG. 1 according to inventive concepts disclosed herein.

FIG. 2 is a schematic illustrating one of the infrared cameras 10 having a particular FOV 50. The infrared camera 10 has imaging optics 30 and an infrared detector 40. The imaging optics 30 are arranged to image infrared light onto the infrared detector 40. The imaging optics 30 may include one or more refractive and/or reflective and/or diffractive optical elements. The refractive optical elements may include lenses, for example. The reflective optical elements may include mirrors, for example. The diffractive elements may include diffraction gratings, for example.

Referring to FIG. 2, the imaging optics 30 has a FOV 50, which has a center optical axis 52. The FOV 50 is bounded by boundaries 54a and 54b, which bound the FOV 50 on sides of the FOV 50.

Referring back to FIG. 1, the infrared image sensor 100 may have a plurality of image cameras 10 like the one in FIG. 2, where each of the cameras 10 has a FOV 50 with a center optical axis 52 and bounded by boundaries 54a and 54b. FIG. 1, for example, illustrates three cameras 10 for ease of illustration, where in general the number of cameras 10 may be more than three, or may be two, according to embodiments of the inventive concepts disclosed herein.

The infrared cameras 10 are arranged and oriented such that the center optical axes 52 of the FOVs 50 intersect with each other, and the FOVs 50 overlap with each other. In particular, the center optical axes 52 intersect each other on a side of the focusing optics 30 opposite to the infrared detector 40. The intersection of the center optical axes 52 of the FOVs 50 provides an infrared sensor 100 with a cross-eyed sensor mosaic arrangement of the infrared cameras 10 where the center optical axes of the FOVs 50 cross each other.

The particular infrared detectors 40 depends on the band of infrared radiation to be detected. For example, if radiation is to be detected in the short wave infrared (SWIR) region, the infrared detectors 40 should be sensitive to short wave infrared radiation in the wavelength range of 1-3 µm. In this case the infrared detectors 40 may include InGaAs material, for example.

As another example, if radiation is to be detected in the visible or ultra-violet (UV), or near infrared regions, the detectors 40 should be sensitive to UV (wavelength <0.4 µm) or visible light in the wavelength range of 0.4-0.7 µm, or near infrared in the region 0.7-1.0 µm.

As another example, if radiation is to be detected in the midwave infrared (MWIR) region, the infrared detectors 40 should be sensitive to midwave infrared radiation in the wavelength range of 3-5 µm. In this case the infrared detectors 40 may include InSb material, for example.

As another example, if radiation is to be detected in the long wavelength infrared region, the infrared detectors 40 should be sensitive to long wavelength infrared radiation in the wavelength range of 8-14 µm. In this case the infrared detectors 40 may include vanadium oxide material, for example, and may be bolometers which measure the heat due to absorbed radiation. The infrared detectors 40 may include microbolometers operating at room temperature. Alternatively, the infrared detectors 40 may include cryogenically cooled infrared detectors operating at cryogenically cooled temperatures.

According to the inventive concepts disclosed herein each of the infrared detectors 40 may include a single material sensitive to infrared radiation in a particular band. Alternatively, each of the infrared detectors 40 may include multiple different materials, each material sensitive to infrared radiation in a different band.

The infrared image sensor 100 may include an optical window 60 through which the FOVs 50 pass. The optical window may be arranged to protect the cameras 10 from contamination and/or severe weather, or dust and abrasion, in addition to proving a viewing window. In some embodiments of the inventive concepts disclosed herein, the optical window 60 may be a single optical window, and all of the FOVs 50 may pass through the optical window 60.

The cross-eyed arrangement of the infrared cameras 10 which allows all of the FOVs 50 to pass through a single optical window 60 beneficially allows for a decrease in the size and weight of the infrared sensor 100.

Alternatively, the infrared sensor 100 need not include an optical window 60 through which pass the FOVs 50. The cross-eyed arrangement of the infrared cameras 10 would still allow for a decrease in the size and weight of the infrared sensor 100.

Embodiments of the inventive concepts disclosed are not limited to a single or no optical window 60. For example, the infrared sensor 100 may include multiple optical windows, where the FOVs 50 pass through separate windows of the multiple optical windows.

The window 60 may be made of a material which is transparent to the infrared radiation for which the infrared detectors 40 are sensitive. For example, the window 60 may be made of Ge or Si, for certain regions of the infrared spectrum to be detected.

The infrared sensor 100 may further include a heater 65 to heat the window 60. For example, the heater 65 may prevent or reduce icing of the window. According to embodiments of the inventive concepts disclosed herein where the infrared sensor 100 includes a single window 60 and thus a single heater 65, power may be reduced due to only a single heater 65 needing to be powered to heat a single window, which may be relatively small.

The infrared sensor 100 may further include a single shutter 67. The shutter 67 allows for a single shutter to be used for Non-Uniformity Correction (NUC) on all of the cameras 10. Pixels from each of the cameras 10 tend to drift over time. A uniform temperature shutter allows for correction of the drift via NUC. By using a single shutter 67 for all of the cameras 10, reliability increases, and a significant reduction of cost and size may be achieved. The controller 20 may control the opening and closing of the shutter 67. The controller 20 may further be arranged to perform Non-Uniformity Correction on each of the cameras 10 based on infrared light from the shutter 67 when closed Each of the infrared cameras 10 may produce an image, which is received by the controller 20. In general, the image produced by each infrared camera 10 is based on an array of pixels of the individual infrared camera 10. The controller 20 may generate a composite image based on the individual images received from the infrared cameras 10. The composite image may be formed in a number of ways. For example, each camera 10 may be displayed on its own screen, and the screens may be butted together. No image processing is required, but there will be some overlap between the cameras on the displays. As another example, the controller 20 may merge the individual images together into a larger array. The individual cameras are registered using fiducial points that are located in the overlap area between the cameras. In either case, the resolution is increased because more pixels are arranged across the FOV.

Figure 3A:
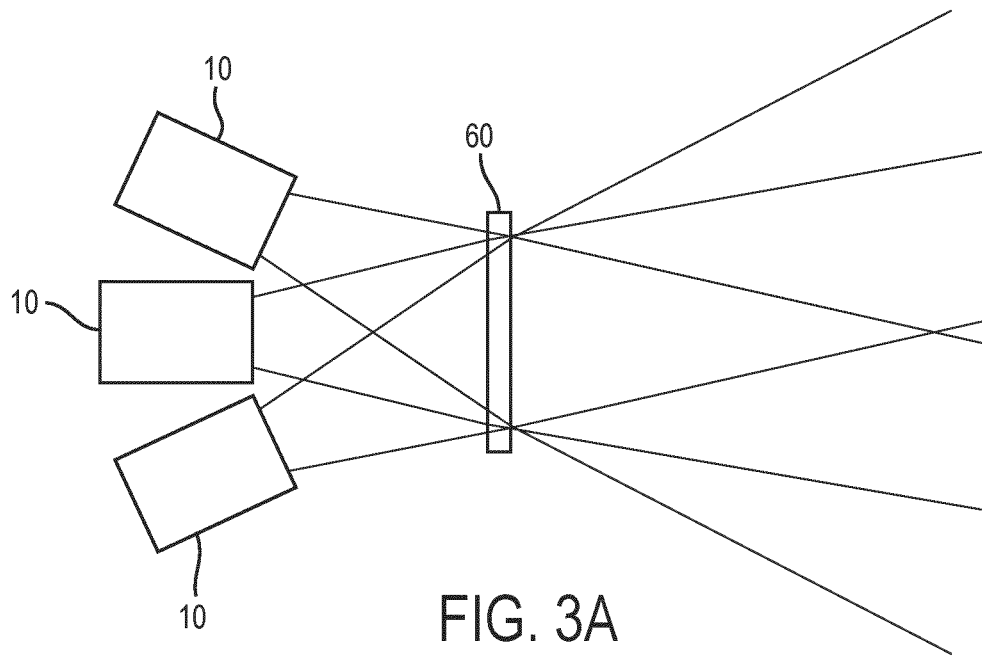
FIG. 3A is a schematic illustrating a side view of an arrangement of infrared cameras according to inventive concepts disclosed herein.
Figure 3B:
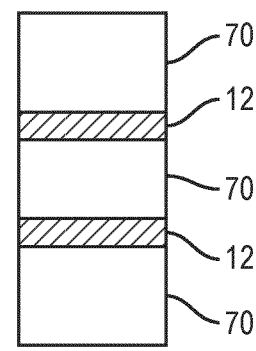
FIG. 3B is a schematic illustrating overlapped images corresponding to fields of view of the arrangement of infrared cameras of FIG. 3A according to inventive concepts disclosed herein.

The infrared cameras 10 may be arranged in an array, such as a one-dimensional array or a two-dimensional array. FIGS. 3A and 3B illustrates the infrared cameras 10 in a one-dimensional array. FIG. 3A is a side view of the infrared cameras 10, while FIG. 3B shows the overlapped images 70 corresponding to the fields of view of the infrared cameras 10 in the one dimensional array. For ease of illustration FIGS. 3A and 3B illustrate an array with three cameras 10. In general the number of cameras 10 may be more than three, or may be two, for example.

In addition to the one-dimensional array of infrared cameras, FIG. 3A further illustrates an optical window 60 through which FOVs 50 with a center optical axis 52 pass. In a similar fashion to the arrangement in FIG. 1, in FIG. 3A, infrared cameras 10 are arranged and oriented such that the center optical axes 52 of the FOVs 50 intersect with each other, and the FOVs 50 overlap with each other. The intersection of the center optical axes 52 of the FOVs 50 provides an infrared sensor 100 with a cross-eyed sensor mosaic arrangement of the infrared cameras 10 where the center optical axes of the FOVs 50 cross each other.

FIG. 3B illustrates the images 70 corresponding to the fields of view of each infrared camera 10 in the one dimensional array. The individual images 70 have the resolution of the individual camera corresponding to the individual image, for example, VGA. As can be seen, there is an overlap region 12 of images 70 between adjacent infrared cameras 10. This overlap region 12 beneficially allows for registration of adjacent infrared cameras 10. Further the overlap region 12 beneficially accommodates for distortion of the image generated from the infrared camera's optics 10.

Figure 4A:
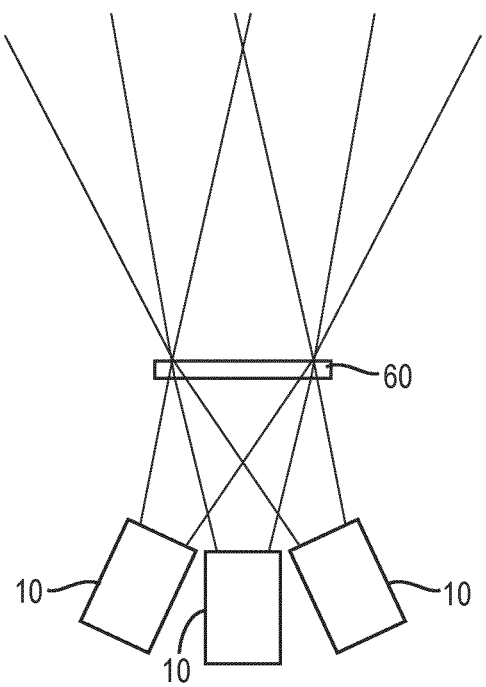
FIG. 4A is a schematic illustrating a side view of a single row of infrared cameras of a two dimensional arrangement of infrared cameras according to inventive concepts disclosed herein.
Figure 4B:
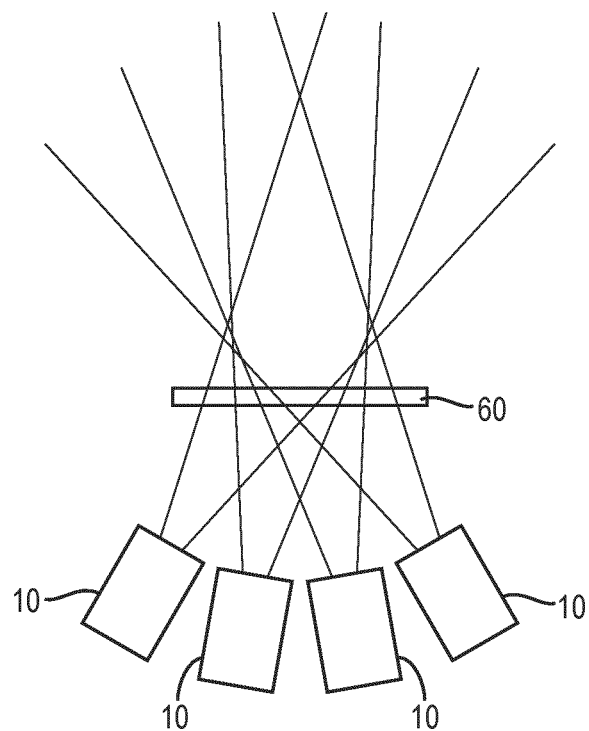
FIG. 4B is a schematic illustrating a side view of a single column of infrared cameras of a two dimensional arrangement of infrared cameras according to inventive concepts disclosed herein.
Figure 4C:
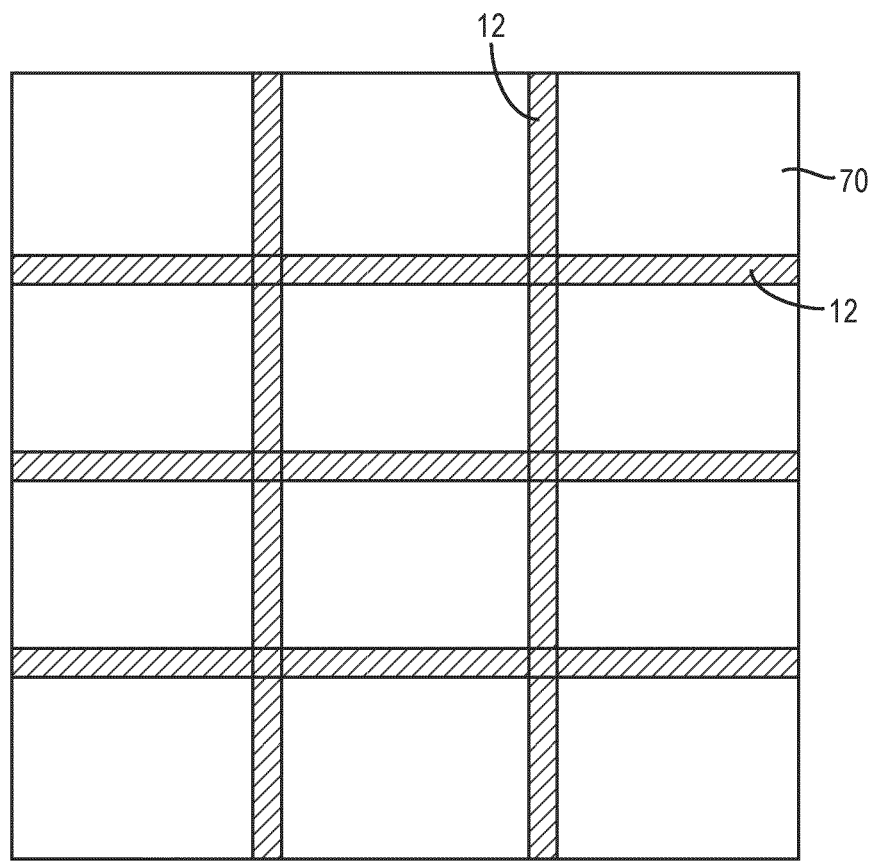
FIG. 4C is a schematic illustrating overlapped images corresponding to fields of view of the two dimensional arrangement of infrared cameras of FIGS. 4A and 4B according to inventive concepts disclosed herein.

FIGS. 4A-4C illustrate the infrared cameras 10 arranged in a two-dimensional cross-eyed array. FIGS. 4A and 4B are side views (row and column, respectively) of the infrared cameras 10, while FIG. 4C shows the overlapped images 70 corresponding to the fields of view of the infrared cameras 10 in the two-dimensional array. For ease of illustration FIGS. 4A-4C illustrate a 3-by-4 array with twelve cameras 10. In general the array may be other than a 3-by-4 array, and the number of cameras 10 may be more than twelve, or less than twelve, for example.

In addition to the two-dimensional array of infrared cameras 10, FIGS. 4A and 4B further illustrate an optical window 60 through which FOVs 50 with a center optical axis 52 pass. In a similar fashion to the arrangement in FIG. 1, in FIGS. 4A and 4B, infrared cameras 10 are arranged and oriented such that the center optical axes 52 of the FOVs 50 intersect with each other, and the FOVs 50 overlap with each other. The intersection of the center optical axes 52 of the FOVs 50 provides an infrared sensor 100 with a cross-eyed sensor mosaic arrangement of the infrared cameras 10 where the center optical axes of the FOVs 50 cross each other.

FIG. 4C illustrates the overlapped images 70 corresponding to the fields of view of the infrared cameras 10 in the two-dimensional array, where the infrared cameras are arranged in rows (left to right) and columns (up and down). As can be seen, there is an overlap region 12 between images 70 corresponding to the fields of view of adjacent infrared cameras 10. As mentioned above with respect to FIG. 3B, this overlap region 12 beneficially allows for registration of adjacent infrared cameras 10. Further the overlap region 12 beneficially accommodates for distortion of the image generated from the infrared cameras 10. The overlap region 12 may be different, or the same, between rows and columns.

As described above, some embodiments of the inventive concepts disclosed herein regarding a cross-eyed field of view arrangement provide for a lower SWAP-C by allowing for a single optical window through which pass the field of views of the different cameras arranged in a mosaic. This arrangement is in contrast to a butted field of view mosaic arrangement, which typically have a separate optical window for each camera, or would require a very large window for all of the cameras.

As described further above, according to embodiments of the inventive concepts disclosed herein regarding a cross-eyed field of view arrangement for the cameras, and a controller that generates a composite image based on the images of each of the cameras, a composite image can be generated having an increased resolution and/or field of view as compared to the images from individual cameras. The arrangement allows for an increase in pixels in a desired FOV compared to that for a single camera. Thus, for example, if the resolution of the image of the individual cameras is VGA, the composite image generated may have a resolution greater than that of VGA.

Embodiments of the inventive concepts disclosed herein are not limited to an infrared sensor, but may include an optical sensor generally where the detectors of the sensor are sensitive to radiation outside of the infrared region, such as visible light or ultraviolet light, for example.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. An infrared sensor comprising:
a single optical window;
a plurality of infrared cameras arranged in a two-dimensional array that spatially extends in two directions,
each infrared camera comprising:
an infrared detector; and
imaging optics arranged to image infrared light onto the infrared detector, the imaging optics having a field of view with a center optical axis, and field of view boundary lines bounding the field of view on sides of the field of view, wherein the infrared cameras are arranged such that the center optical axes of the fields of view intersect each other at a common intersection point, and the fields of view overlap each other;
wherein an entirety of the field of view of each of the plurality of infrared cameras at the single optical window passes through the single optical window.

2. The infrared sensor of claim 1, further comprising a controller configured to receive images from each of the infrared cameras and to generate a composite image based on the received images from each of the infrared cameras.

3. The infrared sensor of claim 2, wherein the composite image has a higher resolution than a resolution of a single one of the infrared cameras with a same total field of view.

4. The infrared sensor of claim 3, wherein the composite image has a larger field of view than a field of view of the single one of the infrared cameras.

5. The infrared sensor of claim 2, wherein adjacent of the infrared cameras have overlapping images.

6. The infrared sensor of claim 1, further comprising a heater arranged to heat the single optical window.

7. The infrared sensor of claim 2, further comprising a single shutter,
the controller arranged to open and close the shutter, and to perform Non-Uniformity Correction on each of the cameras based on infrared light from the shutter when closed.

8. The infrared sensor of claim 1, where the infrared detectors are sensitive to at least one of near infrared radiation in a wavelength range of 0.7 to 1 μm, short wave infrared radiation in the wavelength range of 1 to 3 μm, midwave infrared radiation in the wavelength range of 3 to 5 μm and long wavelength infrared radiation in the wavelength range of 8-14 μm.

9. The infrared sensor of claim 1, where the infrared detectors are room temperature detectors.

10. The infrared sensor of claim 1, where the infrared detectors are cryogenically cooled detectors.

11. The infrared sensor of claim 1, wherein the infrared detectors include bolometers.

12. The infrared sensor of claim 2, wherein the controller is configured to register each of the plurality of infrared cameras using fiducial points located in an overlap portion of an image received from each of the plurality of infrared cameras.

13. The infrared sensor of claim 1, wherein the single optical window is a material that is transparent to infrared radiation having a wavelength that the plurality of infrared cameras are configured to measure.

14. An infrared sensor comprising:
a plurality of infrared cameras,
each infrared camera comprising:
an infrared detector sensitive to long wavelength infrared radiation in the wavelength range of 8-14 µm; and
imaging optics arranged to imaging infrared light onto the infrared detector, the imaging optics having a field of view with a center optical axis, and field of view boundary lines bounding the field of view on sides of the field of view, wherein the infrared cameras are arranged such that the center optical axes of the fields of view intersect each other, and the fields of view overlap each other; and
a controller configured to receive images from each of the infrared cameras and to generate a composite image based on the received images from each of the infrared cameras,
wherein the plurality of infrared cameras are spatially arranged according to an array in rows and column and are oriented towards a common point of interest.

15. The infrared sensor of claim 14, further comprising a single optical window, wherein all of the fields of view pass through the single optical window.

16. The infrared sensor of claim 14, wherein the infrared detector comprises a plurality of materials each sensitive to a different wavelength band of infrared radiation.

17. The infrared sensor of claim 16, wherein at least one of the plurality of materials is sensitive to long wavelength infrared radiation in a wavelength range of 8-14 µm, another one of the plurality of materials is sensitive to midwave infrared radiation in a wavelength range of 3-5 µm, and another of the of the plurality of materials is sensitive to short wave infrared radiation in a wavelength range of 1-3 µm.

18. An optical sensor comprising:
a plurality of cameras spatially arranged in two directions and each spatially oriented towards a common point of interest,
each camera comprising:
a detector; and
imaging optics arranged to image light onto the detector, the imaging optics having a field of view with a center optical axis, and field of view boundary lines bounding the field of view on sides of the field of view, wherein the cameras are arranged such that the center optical axes of the fields of view intersect each other at the common point of interest, and the fields of view overlap each other.

19. The sensor of claim 18, where the detectors are sensitive to visible light.

20. The sensor of claim 18, where the detectors are sensitive to ultraviolet light.

* * * * *